US008287393B2

(12) United States Patent
Dao et al.

(10) Patent No.: US 8,287,393 B2
(45) Date of Patent: Oct. 16, 2012

(54) INNER SEAL FOR CV JOINT BOOT

(76) Inventors: Duc Dao, Barrie (CA); Jamie White, East Caledon (CA); Max Gibbs, Livonia, MI (US); Michael R. Harrison, Dearborn, MI (US); Mike Hopson, Clinton Township, MI (US)

( * ) Notice: Subject to any disclaimer, the term of this patent is extended or adjusted under 35 U.S.C. 154(b) by 874 days.

(21) Appl. No.: 11/917,266

(22) PCT Filed: Jun. 13, 2006

(86) PCT No.: PCT/CA2006/000966
§ 371 (c)(1),
(2), (4) Date: Jun. 13, 2008

(87) PCT Pub. No.: WO2006/133550
PCT Pub. Date: Dec. 21, 2006

(65) Prior Publication Data
US 2010/0164186 A1   Jul. 1, 2010

Related U.S. Application Data

(60) Provisional application No. 60/689,536, filed on Jun. 13, 2005.

(51) Int. Cl.
*F16D 3/84* (2006.01)
(52) U.S. Cl. ........................ 464/173; 464/906
(58) Field of Classification Search .................. 464/175, 464/173, 131, 905, 906; 277/634–636; 403/50, 403/51; 74/18, 8.1, 18.21
See application file for complete search history.

(56) References Cited

U.S. PATENT DOCUMENTS
1,216,508 A * 2/1917 Spade ........................... 464/125
(Continued)

FOREIGN PATENT DOCUMENTS
DE   3500429 A1 * 8/1985
(Continued)

OTHER PUBLICATIONS
International Search Report, International Application No. PCT/CA2006/000966, mailed Sep. 26, 2006.

*Primary Examiner* — Gregory Binda
*Assistant Examiner* — Matthieu Setliff
(74) *Attorney, Agent, or Firm* — Michael Best & Friedrich LLP (57) ABSTRACT

An inner seal is provided for protecting a CV joint boot for a CV joint. The CV joint includes a bearing, a back sealing means and a front can. The bearing operatively connects a first shaft and a second shaft. The bearing has an inner race and an outer race and has a front and a back. The first shaft is connected to the inner race. The second shaft is connected to the outer race. The front can is connected to the outer race. The back sealing means seals against leakage of lubricant from the back of the bearing. The inner seal comprises an inner seal body having a front can sealing portion for sealing with the front can to inhibit the migration of lubricant from the bearing therebetween. The inner seal body has a shaft sealing portion for sealing with the first shaft to inhibit the migration of lubricant from the bearing therebetween. The inner seal body has a shield portion that extends between the front can sealing portion and the shaft sealing.

13 Claims, 9 Drawing Sheets

U.S. PATENT DOCUMENTS

| | | | | |
|---|---|---|---|---|
| 2,227,687 | A | * | 1/1941 | Wollner ................ 464/175 |
| 2,308,073 | A | * | 1/1943 | Hagerty ................ 464/175 |
| 2,432,803 | A | * | 12/1947 | Rice ................ 464/7 |
| 2,442,640 | A | * | 6/1948 | Dunn ................ 29/451 |
| 3,362,193 | A | * | 1/1968 | Ritsema ................ 464/146 |
| 3,381,987 | A | * | 5/1968 | Husen ................ 403/51 |
| 3,583,244 | A | * | 6/1971 | Teinert ................ 403/51 |
| 3,623,340 | A | * | 11/1971 | Maas ................ 464/175 |
| 4,121,844 | A | | 10/1978 | Nemoto et al. |
| 4,183,289 | A | | 1/1980 | Jinnouchi |
| 4,287,814 | A | | 9/1981 | Jinnouchi |
| 4,456,269 | A | * | 6/1984 | Krude et al. ................ 277/636 |
| 4,718,680 | A | * | 1/1988 | Halconruy et al. ................ 277/346 |
| 4,946,303 | A | * | 8/1990 | Sawicki ................ 403/50 |
| 5,123,660 | A | | 6/1992 | Dahlheimer et al. |
| 5,183,351 | A | | 2/1993 | Schneider |
| 5,230,660 | A | * | 7/1993 | Warnke ................ 464/146 |
| 5,295,914 | A | | 3/1994 | Milavec |
| 5,297,996 | A | * | 3/1994 | Draga ................ 464/175 |
| 5,318,480 | A | | 6/1994 | Essi et al. |
| 5,346,431 | A | | 9/1994 | Okuyama et al. |
| 5,558,580 | A | | 9/1996 | Okuyama et al. |
| 5,599,029 | A | | 2/1997 | Umeno |
| 5,707,066 | A | | 1/1998 | Sugiura et al. |
| 5,733,986 | A | | 3/1998 | Senda et al. |
| 5,743,669 | A | | 4/1998 | Fujita et al. |
| 5,758,880 | A | | 6/1998 | Ice et al. |
| 5,848,617 | A | | 12/1998 | Enomoto |
| 5,879,238 | A | * | 3/1999 | Breheret ................ 464/175 |
| 5,910,278 | A | | 6/1999 | Enomoto |
| 5,954,587 | A | | 9/1999 | Jacob et al. |
| 6,003,878 | A | | 12/1999 | Noble et al. |
| 6,171,010 | B1 | | 1/2001 | Nagashima et al. |
| 6,173,966 | B1 | | 1/2001 | Noble et al. |
| 6,209,885 | B1 | | 4/2001 | Mukaida et al. |
| 6,220,969 | B1 | | 4/2001 | Lilley |
| 6,319,132 | B1 | * | 11/2001 | Krisher ................ 464/143 |
| 6,579,187 | B2 | * | 6/2003 | Ramey ................ 464/17 |
| 6,663,494 | B2 | | 12/2003 | Curi |
| 6,685,428 | B1 | | 2/2004 | Freudenberg |
| 6,764,243 | B1 | | 7/2004 | Inuzuka et al. |
| 6,793,584 | B2 | * | 9/2004 | Ramey et al. ................ 464/175 |
| 6,805,357 | B2 | | 10/2004 | Dahlheimer |
| 6,830,074 | B2 | | 12/2004 | Wang |
| 6,938,902 | B2 | | 9/2005 | Devers |
| 7,029,399 | B2 | * | 4/2006 | Oki et al. ................ 464/175 |
| 7,115,036 | B2 | * | 10/2006 | Masuda ................ 464/17 |
| 7,347,787 | B2 | * | 3/2008 | Ohshita et al. ................ 464/173 |
| 7,371,181 | B2 | * | 5/2008 | Kozlowski et al. ................ 464/175 |
| 7,677,981 | B2 | * | 3/2010 | Zierz et al. ................ 464/173 |
| 7,708,645 | B2 | * | 5/2010 | Miller et al. ................ 464/173 |
| 7,736,239 | B2 | * | 6/2010 | Niederhufner et al. ................ 464/175 |
| 7,909,702 | B2 | * | 3/2011 | Nishio ................ 464/182 |
| 2004/0204253 | A1 | * | 10/2004 | Wohlschlegel ................ 464/173 |
| 2005/0029750 | A1 | | 2/2005 | Deisinger et al. |
| 2009/0078084 | A1 | * | 3/2009 | Compau ................ 277/636 |
| 2010/0130294 | A1 | * | 5/2010 | Nakagawa ................ 464/175 |

FOREIGN PATENT DOCUMENTS

| | | | |
|---|---|---|---|
| FR | 2591301 | | 6/1987 |
| GB | 2086534 A | * | 5/1982 |
| JP | 2004060770 | | 2/2004 |
| WO | 03/004891 | | 1/2003 |

* cited by examiner

INNER SEAL FOR CV JOINT BOOT

FIELD OF THE INVENTION

The present invention relates to CV joint boots, and more particularly the invention relates to an inner seal for protecting a CV joint boot.

BACKGROUND OF THE INVENTION

A CV joint is a structure that permits two shafts to connect to each other. In particular a CV joint can be used when transferring rotational energy from a first shaft to a second shaft, when a non-zero angle exists between the two shafts, or when the shafts are expected to move relative to each other during use. A typical application for a CV joint is in a passenger vehicle, however, they are also used in numerous other applications.

A CV joint typically includes a bearing, comprising an inner race, an outer race, a plurality of rolling elements positioned between the inner and outer races, and a cage which retains the balls. The first shaft is mounted to the inner race, and typically extends through an aperture in the inner race. The second shaft is mounted to the outer race. On one side of the bearing, a flexible boot typically mounts between the first shaft and a member called a front can, which itself is connected to the outer race. The flexible boot, typically referred to as a CV joint boot, protects the other side of the bearing from contamination by debris or dirt from the surrounding environment during use. On the other side of the bearing there is some structure that protects the bearing from contamination by debris or dirt from the surrounding environment during use.

Lubricant is typically used in the bearing to inhibit wear of the rolling elements. During use of the CV joint, however, some lubricant can migrate out from the bearing and eventually can make its way into the interior of the CV joint boot. Depending on a variety of factors, the presence of enough lubricant in the boot can overstress the boot at a sufficiently high rotational speed of the joint, eg greater than 5000 rpm, and can ultimately lead to tearing of the boot during use.

Consequently, there is a need for a way of inhibiting the migration of bearing lubricant into the interior of the CV joint boot during use of the CV joint.

SUMMARY OF THE INVENTION

In a first aspect, the invention is directed to an inner seal for protecting a CV joint boot for a CV joint. The CV joint includes a bearing, a back sealing means and a front can. The bearing operatively connects a first shaft and a second shaft. The bearing has an inner race and an outer race and has a front and a back. The first shaft is connected to the inner race. The second shaft is connected to the outer race. The front can is connected to the outer race. The back sealing means seals against leakage of lubricant from the back of the bearing. The CV joint boot seals with the front can. The CV joint boot has an interior. The inner seal comprises an inner seal body having a front can sealing portion for sealing with the front can to inhibit the migration of lubricant from the bearing into the interior of the CV joint boot. The inner seal body has a shaft sealing portion for sealing with the first shaft to inhibit the migration of lubricant from the bearing into the boot. The inner seal body has a shield portion that extends between the front can sealing portion and the shaft sealing portion.

In a second aspect, the invention is directed to a combined CV joint boot and inner seal for mounting to a CV joint. The CV joint includes a bearing, a back sealing means and a front can. The CV joint has a CV joint longitudinal axis. The bearing operatively connects a first shaft and a second shaft. The bearing has an inner race and an outer race and has a front and a back. The first shaft is connected to the inner race. The second shaft is connected to the outer race. The front can is connected to the outer race. The back sealing means seals against leakage of lubricant from the back of the bearing. The combined CV joint boot and inner seal comprises a boot portion having a first end and a second end and having a shaft sealing portion at the first end for sealing with the first shaft. The boot portion has an interior. The combined CV joint boot and inner seal further comprises a front can sealing portion for sealing with the front can. The front can sealing portion is positioned at the second end of the boot portion. The combined CV joint boot and inner seal further comprises an inner seal portion. In use, the inner seal portion extends generally inwardly towards the CV joint longitudinal axis from the front can sealing portion to block lubricant from migrating into the interior of the boot portion.

In a third aspect, the invention is directed to an inner seal for protecting a CV joint boot for a CV joint. The CV joint includes a bearing, a back sealing means and a front can. The CV joint has a CV joint longitudinal axis. The bearing operatively connects a first shaft and a second shaft. The bearing has an inner race and an outer race and has a front and a back. The first shaft is connected to the inner race. The second shaft is connected to the outer race. The back seating means seals against leakage of lubricant from the back of the bearing. The front can is connected to the outer race. The front can has an outer surface and an inner surface. The CV joint boot seals with the front can. The inner seal comprises an inner seal body having a front can sealing portion for forming a connection with the front can and for sealing with the inner surface of the front can to inhibit the migration of lubricant therebetween. In use, the connection between the inner seal and the front can is entirely separate from the connection between the front can and the outer race. In use, the inner seal body extends from the front can sealing portion generally inwardly towards the CV joint longitudinal axis to block lubricant from migrating into the interior of the CV joint boot.

In a fourth aspect, the invention is directed to a combination for use with a CV joint. The CV joint includes a bearing and a back sealing means and has a CV joint longitudinal axis. The bearing operatively connects a first shaft and a second shaft. The bearing has an inner race and an outer race and has a front and a back. The first shaft is connected to the inner race. The second shaft is connected to the outer race. The back sealing means seals against leakage of lubricant from the back of the bearing. The combination includes a front can, wherein the front can is connectable to the outer race. The front can has an outer surface and an inner surface. The front can and a combined CV joint boot and inner seal. The front can has a crimping portion. The combined CV joint boot and inner seal includes a boot portion having a first end and a second end and having a shaft sealing portion at the first end for sealing with the first shaft. The boot portion has an interior. The combined CV joint boot and inner seal further includes a front can sealing portion for forming a seal with the front can. The front can sealing portion is positioned at the second end of the boot portion. The front can sealing portion includes a flange portion. The crimping portion is crimped over the flange portion. The combined CV joint boot and inner seal further includes an inner seal portion. The inner seal portion extendible generally inwardly towards the CV joint longitudinal axis from the front can sealing portion to block lubricant from migrating into the interior of the boot portion.

BRIEF DESCRIPTION OF THE DRAWINGS

The present invention will now be described by way of example only with reference to the attached drawings in which:

FIG. 1b is a magnified sectional side view of a portion of the CV joint and inner seal shown in FIG. 1a;

FIG. 1c is another magnififed sectional side view of a portion of the CV joint and inner seal shown in FIG. 1a;

DETAILED DESCRIPTION OF THE INVENTION

Figure 1A:
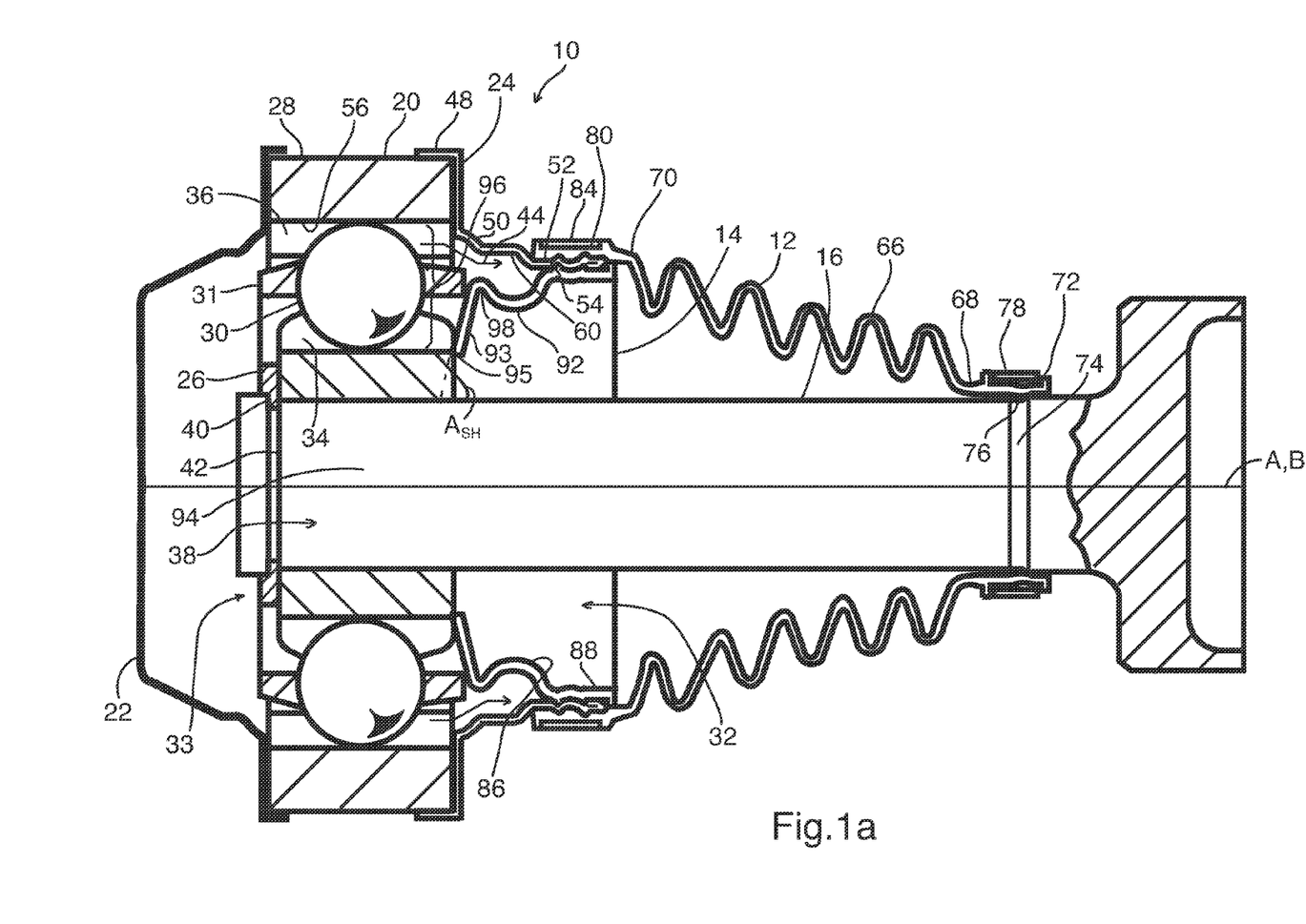
FIG. 1a is a sectional side view of an inner seal for a CV joint in accordance with an embodiment of the present invention.
Figure 1B:
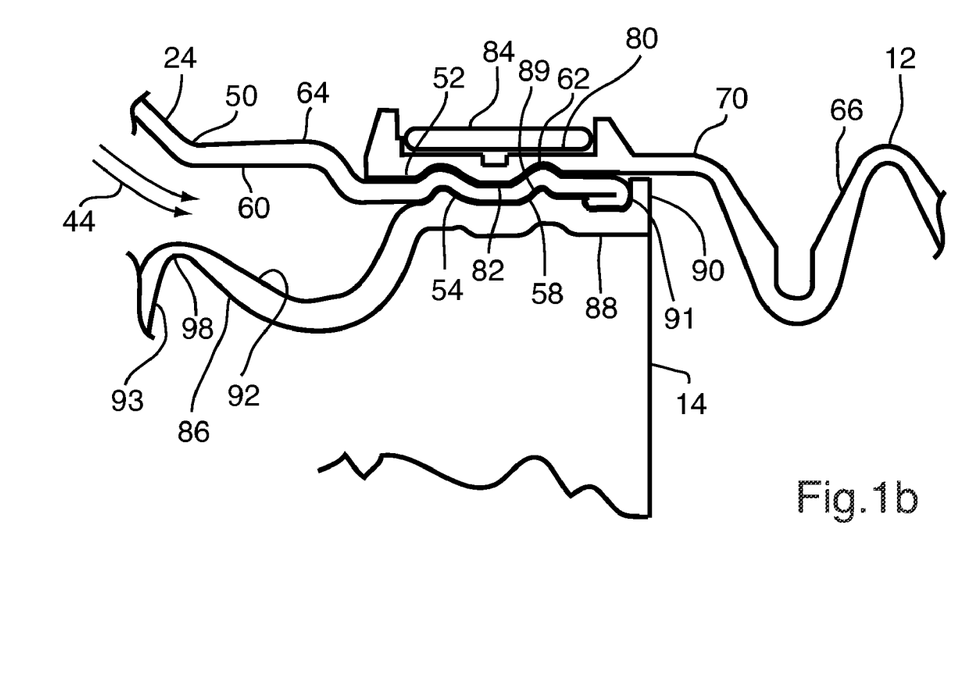
Figure 1C:
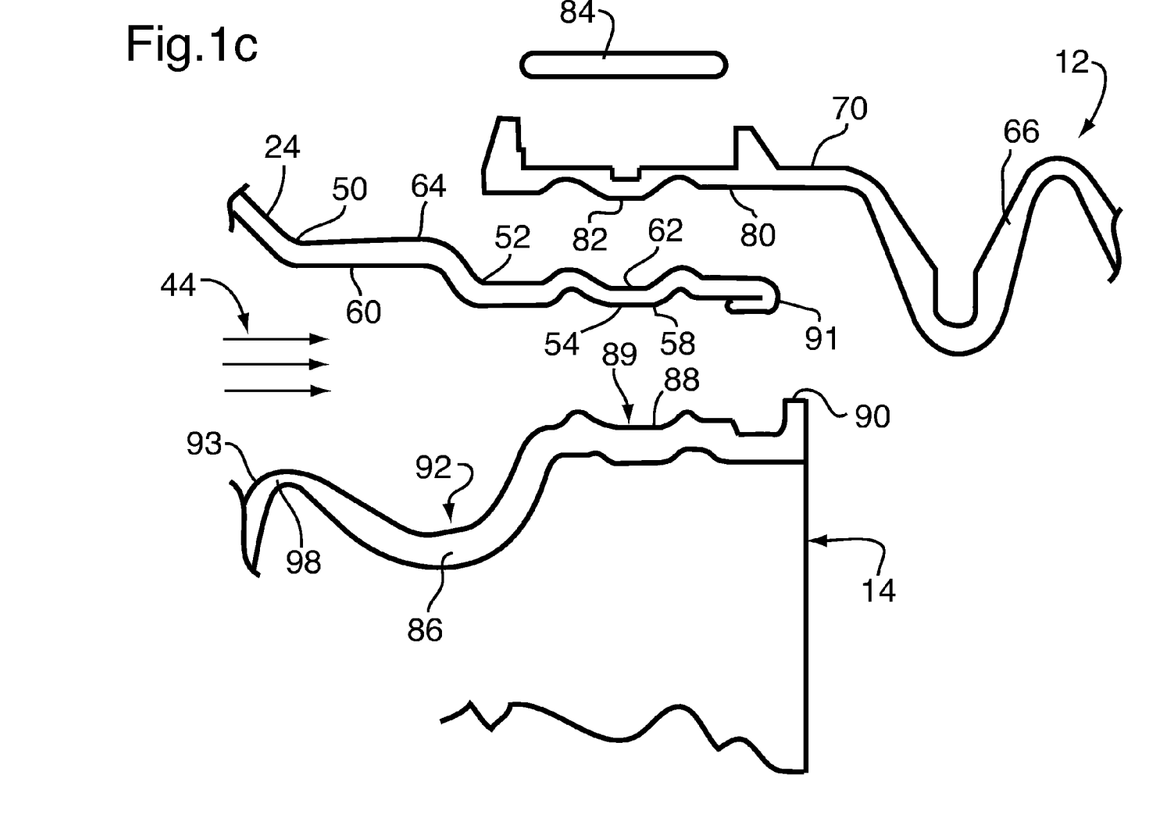

Reference is first made to FIGS. 1a-1c, which illustrate a CV joint 10 with a CV joint boot 12 and an inner seal 14 made in accordance with a first embodiment of the present invention.

The CV joint 10 is used to operatively connect a first shaft 16 to a second shaft (not shown). During use, the first and second shafts may extend at a non-zero angle with respect to each other (not shown). Furthermore, in use, they may move longitudinally relative to each other. One or both of these conditions may occur either intermittently or constantly. The CV joint 10 may be configured to operate under one or more of these conditions.

The CV joint 10 has a longitudinal axis A and includes a bearing 20, a back sealing means 22 and a front can 24. The bearing 20 includes an inner race 26, an outer race 28, a plurality of roller elements 30 and a cage 31. The bearing 20 also has a front 32 and a back 33. The roller elements 30 operatively connect the inner and outer races 26 and 28, while permitting the races 26 and 28 to move longitudinally and/or angularly relative to each other. The roller elements 30 may be, for example, spherical.

Each roller element 30 sits in part in a pocket 34 in the inner race 26 and in part in a pocket 36 in the outer race 28. The pockets 34 and 36 capture each roller element 30 so that rotational force from the inner race is transmitted to the outer race through the roller elements 30, and vice versa. The cage 31 captures the roller elements to prevent them from escaping from the bearing 20 in the longitudinal direction.

The inner race 26 has a central aperture 38 therethrough which receives the first shaft 16. The first shaft 16 is received in the aperture 38 in such a manner that rotational force from the first shaft 16 is transmitted to the inner race 26 and vice versa. Preferably force can be transmitted without slippage occurring between the two. For example, the end of the first shaft 16 may be splined and the aperture 38 may be provided with a complementary spline for receiving the first shaft 16. Alternatively, the first shaft 16 and the aperture 38 may include a keyway (not shown) for receiving a key (not shown) to effect transfer of force therebetween.

A snap ring 40 may be positioned in a groove 42 on the first shaft 16 to assist in retaining the first shaft 16 and the inner race 26 connected together.

The outer race 28 is connected to the second shaft (not shown). The connection may be by any means that permits transfer of rotational force between the two, preferably without slippage.

The boot 12 and the inner seal 14 have a longitudinal axis B. When the boot 12 and inner seal 14 are mounted on the CV joint 10, the longitudinal axis B may be coaxial with the axis A.

Lubricant 44 is used to lubricate the roller elements 30. The back sealing means 22 may be filled with lubricant 44 to provide a supply of lubricant 44 during use of the CV joint 10. The back sealing means 22 seals with the outer race 28 on the back 33 of the bearing 20 to inhibit the leakage of lubricant 44 therebetween, thereby inhibiting leakage lubricant 44 from the interior of the CV joint 10 to the exterior environment. Additionally, the back sealing means 22 and the outer race 28 seal together to inhibit the passage of dirt and debris therebetween, ie. into the interior of the CV joint 10 from the exterior environment. Dirt and debris can be present in the exterior environment if, for example, the CV joint is used in the drivetrain of a passenger vehicle such as a car, a van or a pick up truck.

The back sealing means 22 may be made from any suitable material such as a corrosion resistant metal (eg. Galvanized steel, stainless steel).

The configuration of the back sealing means 22 may alternatively be different than that which is shown in FIG. 1a. The back sealing means 22 may alternatively be any suitable structure that seals with respect to the bearing 20 sufficiently to inhibit, and preferably prevent, leakage of lubricant 44 out to the exterior environment and to inhibit, and preferably prevent leakage of dirt and debris into the interior of the CV joint 10.

The front can 24 is connected to the outer race 28 and provides a structure to which one end of the CV joint boot 12 can mount. The front can 24 forms a seals with the outer race 28 to inhibit leakage of lubricant 44 out of the CV joint 10, and to inhibit entry of dirt and debris into the CV joint from the exterior environment. It is possible for the front can 24 to be connected directly to the outer race 28, as shown in FIG. 1a, or alternatively for the front can 24 to be connected indirectly to the outer race 28, by means of some intermediate piece or structure (not shown).

The front can 24 has a bearing sealing portion 48, an optional shield portion 50, a boot sealing portion 52 and an inner seal sealing portion 54. The bearing sealing portion 48 is used to form a seal between the front can 24 and the bearing 20 to inhibit leakage of lubricant 44 from the bearing to the exterior environment, and to inhibit entry of dirt and debris from the exterior environment into the CV joint 10, and in particular into the bearing 20. In an embodiment as shown in FIG. 1a wherein the front can 24 directly contacts the outer race 28, the bearing sealing portion 48 may contact a portion of the outer edge surface of the outer race 28, and may extend generally inwards towards the axis A, over some portion of the front 32 of the bearing 20. For example, the bearing sealing portion 48 may extend over the entire front-facing portion of the outer race 28. A suitable adhesive may be used to fix the bearing sealing portion 48 to the bearing 20. Alternatively, the bearing sealing portion 48 may have any other suitable configuration for mounting the front can 24 to the bearing 20 and may mount to and seal with the bearing 20 in any other way, ego by means of a mechanical connection without adhesive.

The shield portion 50 may be directly connected to the bearing sealing portion 48. The shield portion 50 is configured to retard the progress of lubricant 44 migrating in a frontward direction towards the CV joint boot 12. For example, in the embodiment shown in FIG. 1*a*, the shield portion 50 extends in a direction that is longitudinally frontward and generally inward towards the axis A. For example, the shield portion 50 may be generally frusto-conical with a radial distance to the axis A that decreases as the shield portion 50 extends longitudinally frontwards.

During use when the CV joint 10 rotates, lubricant 44 in the bearing 20 is generally urged outwardly away from the axis A. Accordingly, it is expected that at least some portion of the lubricant 44 will be urged toward the inner surface shown at 56, of the outer race 28. From there some lubricant 44 will migrate out of the bearing 20. As a result of the urging of the lubricant 44 is urged generally outwardly away from the axis A by the rotation of the CV joint 10. Because the shield portion 50 extends generally inwardly towards the axis A in a longitudinal direction away from the bearing 20, it inhibits lubricant 44 from migrating along its inner surface.

In an alternative embodiment that is not shown the front can may be without a shield portion. The front can could, for example, have a boot sealing portion and a inner seal sealing portion could be connected directly to the bearing sealing portion 48. As another alternative (not shown), the boot sealing portion and an inner seal sealing portion may be connected by a portion that extends longitudinally at constant radial distance to the axis A, or at increasing radial distance to the axis A in a direction away from the bearing 20. In these alternative embodiments, it will be understood that the resistance by the front can to migration of lubricant 44 will be reduced relative to the embodiment shown in FIG. 1*a*.

The boot sealing portion 52 of the front can 24 receives one end of the CV joint boot 12. The boot sealing portion 52 of the front can 24 may be positioned on the outer surface of the front end of the front can 24. The inner seal sealing portion 54 of the front can 24 may be positioned on the inner surface of the front end of the front can 24. Thus, the boot sealing portion 52 of the front can 24 and the inner seal sealing portion 54 of the front can 24 may be positioned at the same longitudinal position, occupying the outer and inner surfaces of the same portion of the front can 24. However, it is alternatively possible for the two sealing portions 52 and 54 to be at different longitudinal positions relative to each other.

Reference is made to FIG. 1*b*, which shows a magnified view of the front end of the front can' 24. The front can 24 may be provided with a projection 58 on the front can inner surface shown at 60, and a corresponding channel 62 on the front can outer surface, shown at 64. The projection 58 and channel 62 may extend partially or completely about the perimeter of the inner surface 60 of the front can 24. The projection 58 and channel 62 may be continuous around the perimeter of the front can 24. Alternatively, they may be made up of a plurality of spaced projection I channel segments that extend around the perimeter of the front can 24. The projection 58 and channel 62 are described further below.

The front can 24 may be made from any suitable material such as a corrosion resistant metal (eg. Galvanized steel, stainless steel).

Referring to FIG. 1*a*, the CV joint boot 12 protects the CV joint 10 from damage from dirt and debris from the surrounding environment. The boot 12 includes a boot body 66, which has a first end 68 and a second end 70. The boot body 66 may comprise a bellows portion to permit the boot 12 to flex, elongate or shorten as necessary during operation of the CV joint 10.

A shaft sealing portion 72 may be positioned at the first end 68. The shaft sealing portion 72 seals with the first shaft 16, to inhibit the entry of dirt and debris from the outside environment therebetween, thereby inhibiting the entry of dirt and debris from the outside environment into the interior of the CV joint 10.

The shaft 16 may be provided with a circumferential channel 74, which mates with a corresponding projection 76 on the shaft sealing portion 72 of the boot 12. The channel 74 and projection 76 cooperate to position the first end 68 of the boot 12 at a selected longitudinal position, and to assist in retaining the first end 68 of the boot 12 in the said position during operation of the CV joint 10. A holding means 78, such as an oetiker clamp may be used to hold the first end 68 of the boot 12 to the shaft 16. Alternatively, or additionally, a suitable adhesive may be applied between the shaft sealing portion 72 and the shaft 16. The adhesive could provide any suitable portion of the sealing performance between the shaft sealing portion. 72 and the shaft 16.

The inner seal 14 may further include a flange portion 90 (see FIG. 1*b*), which is configured to engage a shoulder 91 on the front can 24. The flange portion 90 and the shoulder 91 cooperate to position the inner seal 14 at a selected position with respect to the CV joint 10. The flange portion 90 and the shoulder 91 may be included whether or not the projection 58 and channel 62 are provided.

A second holding means 84, such as an oetiker clamp, may be used to hold the boot 12 to the front can 24. Additionally, or alternatively, a suitable adhesive may be used to adhere the front can sealing portion 80 on the boot 12 to the front can 24. The adhesive may itself form substantially all of the sealing function between the boot 12 and the front can 24. An example of an adhesive that can be used is a silicone adhesive commonly referred to as a room temperature vulcanizing (RTV) silicone, which is an oxime silicone. For example, a suitable adhesive is provided by LOCTITE™ under the name "Flange Sealant" LOCTITE 5999™, part number 21744.

The boot 12 may be made by any suitable process, and may be made from any suitable material, such as a suitable elastomeric material, to permit repeated flexure of the bellows portion during operation of the CV joint 10 without substantially fatiguing the boot 12.

The inner seal 14 inhibits migration of lubricant 44 from the bearing 20 into the interior of the boot 12, thereby protecting the boot 12. The inner seal 14 has an inner seal body 86, which has a front can sealing portion 88 at one end thereof. The front can sealing portion 88 of the inner seal 14 may be configured to mate with the inner seal sealing portion 54 of the front can 24. The front can sealing portion 88 of the inner seal 14 may have a size that is slightly larger than the size of the inner seal sealing portion 54 of the front can 24. Thus, a press fit, or an interference fit, may be provided between the inner seal 14 and the front can 24. The press fit, or interference fit may provide a sufficiently tight seal between the inner seal 14 and the front can 24, that no further sealing means is necessary. A suitable adhesive may be provided between the inner seal 14 and the front can 24 to improve the seal formed therebetween. Such an adhesive may be applied whether or not there is a press fit or interference fit between the inner seal 14 and the front can 24, however, it can be of particular use in improving the seal in embodiments wherein there is not an press fit or interference fit.

Referring to FIG. 1b, the front can sealing portion 88 of the inner seal 14 may have a channel 89 therein that mates with the projection 58 on the front can 24. The channel 89 may serve to position the inner seal 14 at a selected longitudinal position with respect to the CV joint 10, which in turn ensures that the inner seal 14 is positioned in a desired longitudinal position to perform the function of inhibiting lubricant migration longitudinally towards the interior of CV joint boot 12.

When the inner seal 14 mounts to the inner seal sealing portion 54 of the front can 24, the projection 58 may provide improved performance in the seal achieved between the inner seal 14 and the inner seal sealing portion 54, relative to the seal that would be obtained without the projection 58. An embodiment that would omit one or both of the projection 58 and channel 62 would nonetheless be within the scope of the invention, however. A suitable adhesive could be provided to assist in the performance of the seal to inhibit lubricant migration into the boot 12. Such an adhesive could be used both in embodiments incorporating the projection 58 and channel 62, and in embodiments that do not include a projection and channel.

The inner seal 14 may further include a flange portion 90 (see FIG. 1a), which is configured to engage a shoulder 91 on the front can 24. The flange portion 90 and the shoulder 91 cooperate to position the inner seal 14 at a selected position with respect to the CV joint 10. The flange portion 90 and the shoulder 91 may be included whether or not the projection 58 and channel 62 are provided.

Referring to FIG. 1a, the inner seal body 86 has an optional accumulator portion 92, which is shaped to accumulate a quantity of lubricant 44 that would otherwise be urged to migrate towards the CV joint boot 12. The accumulator portion 92 may have any suitable shape for receiving and accumulating lubricant. For example the accumulator portion 92 may be a generally C-shaped when viewed in a longitudinally extending cross-sectional plane. In the embodiment shown in FIG. 1a, the mouth of the C faces away from the axis A. The accumulator portion 92 of the inner seal body 86 may be positioned immediately adjacent the front can sealing portion BS of the inner seal body B6.

The inner seal body 86 includes a shield portion 93. The shield portion 93 acts as a barrier to inhibit longitudinal flow of lubricant 44 towards the CV joint boot 12. Furthermore, the shield portion 93 may guide any encountered lubricant 44 outwards away from the axis A by virtue of its slope angle $A_{SH}$ with respect to the first shaft 16. The shield portion 93 may, for example, be generally frusto-conical and may have a decreasing diameter in a direction towards the bearing 20. The shield portion 93 may be positioned immediately adjacent and rearward of the accumulator portion 92 and may guide lubricant 44 thereto.

The shield portion 93 may end at a rear aperture 94 of the inner seal 24. The rear aperture 94 should be at least sufficiently large as to permit the passage of the first shaft 16 therethrough.

During rotation of the CV joint 10, any lubricant 44 that escapes the bearing 20 will migrate generally outwardly away from the axis A and is caught on the shield portion 93. Having a frusto-conical configuration increases the likelihood that the lubricant 44 caught on the shield portion 93 will migrate away from the aperture 94, thereby reducing the risk of the lubricant 44 inadvertently making its way into the interior of the boot 12.

The radially inward end, shown at 95, of the shield portion 93 may contact and form a seal with the bearing 20, and may thereby comprise a bearing sealing portion. Preferably, the seal formed between the end 95 of the inner seal 14 and the bearing 20 is formed with the inner race 26, so that the shield portion 93 is configured to shield the boot 12 from the entire open portion of the bearing 20. The open front portion of the bearing 20 is shown at 96, and is the portion between the inner face 56 of the outer race, and the outer face of the inner race 26. The open portion 96 is the portion of the bearing that holds lubricant 44.

Because of the rotation of the CV joint 10, a substantial portion of the lubricant 44 that migrates longitudinally out of the bearing 20 will do so proximate the inner surface 56 of the outer race 28. In an alternative embodiment (not shown), the inner seal 14 can be configured to shield only a radially outer portion of the open portion 96 of the front 32 of the bearing 20. For example, the radially inner end 95 of the shield portion 93 may contact the cage 31 instead of contacting the inner race 26. In this alternative, lubricant 44 that escapes from the bearing 20 between the cage 31 and the outer race 28 can be blocked by the shield portion 93. For applications wherein the lubricant 44 remains sufficiently viscous under the expected operating conditions for the CV joint 10, a relatively small amount of lubricant 44 is likely to escape from the bearing 20 in the region between the cage 31 and the outer face of the inner race 26.

In another alternative that is not shown, it is possible for the shield portion 93 of the inner seal body 86 to not contact the bearing 20. For example, the shield portion 93 can have a free end that is positioned near the bearing but not in contact therewith. In this alternative, the shield portion can still capture lubricant that has migrated radially outwardly and then frontwardly from the bearing 20 during rotation of the CV joint 10.

The inner seal 14 is preferably made sufficiently flexible to accommodate relative angular or longitudinal movement in the CV joint between the first and second shafts. For example, the inner seal 14 may be made from a similar material to the boot 12, so as to be flexible. The inner seal 14 may also include a hinge portion 98, which facilitates flexure of the shield portion 93 relative to the rest of the inner seal 14.

As shown in the embodiment in FIG. 1a, the connection between the inner seal 14 and the front can 24 is entirely separate from the connection between the front can 24 and the bearing 20, and is also entirely separate from the connection between the front can 24 and the boot 12. An advantage provided by the separate connection between the inner seal 14 and the front can 24 is that it permits the inner seal 14 to be retrofit to an existing CV joint without requiring any modification of the existing elements, such as the front can 24. Additionally, it permits a manufacturer to design and manufacture a single CV joint that can use the same front can 24 regardless of whether the inner seal 14 is provided or not. This reduces inventory and other costs associated with having multiple designs for the front can.

Figure 2A:
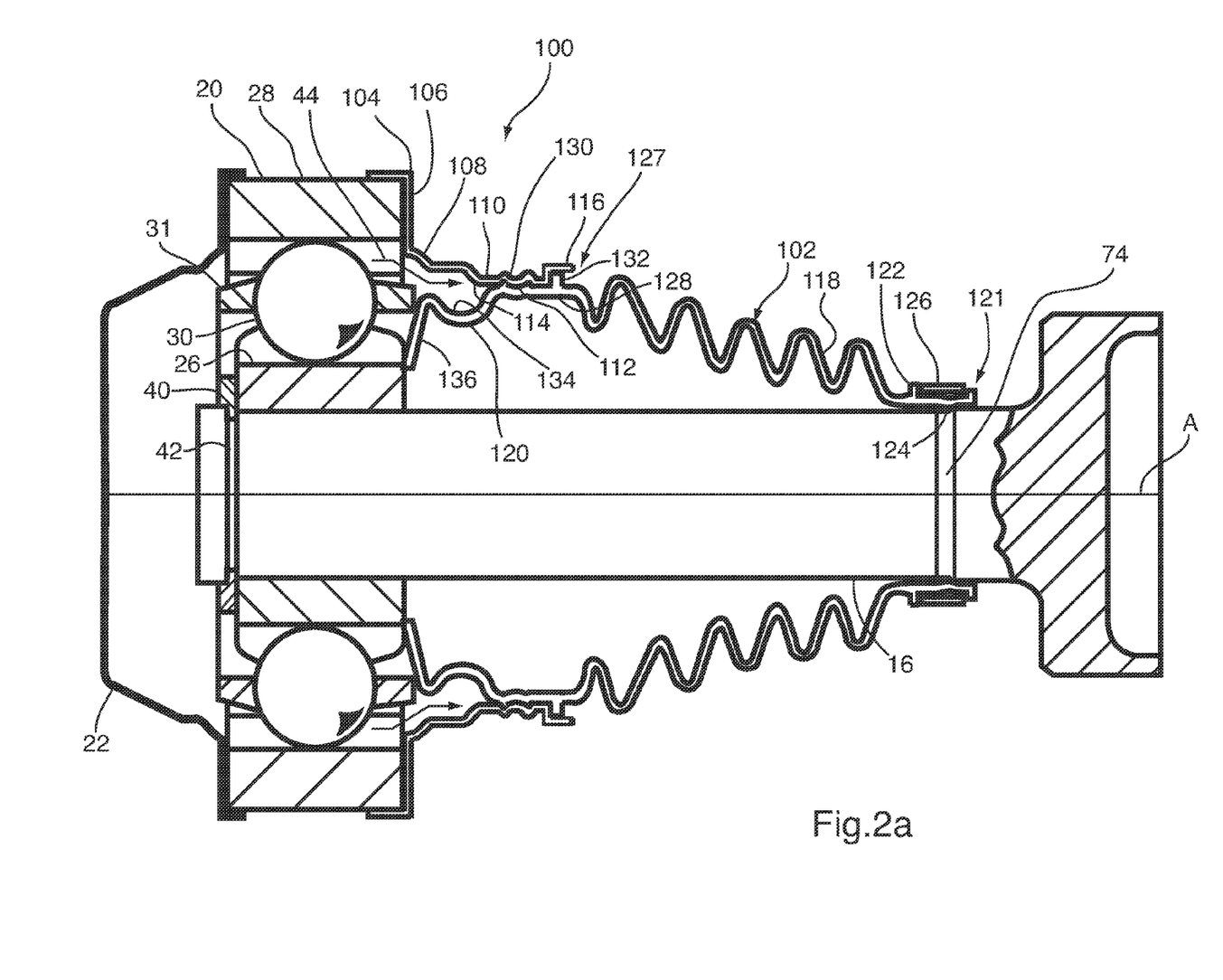
FIG. 2a is a sectional side view of a combined boot and inner seal for a CV joint in accordance with an alternative embodiment of the present invention, shown at an intermediate stage of assembly.

Reference is made to FIG. 2a, which shows a CV joint 100 and a combined CV joint boot and inner seal 102 in accordance with another embodiment of the present invention. The CV joint 100 operatively connects the first and second shafts and includes the bearing 20 and a front can 104.

The front can 104 has a bearing sealing portion 106 that may be similar to the bearing sealing portion 48 (FIG. 1a). The front can 104 may further include a shield portion 108 that may be similar to the shield portion 50 (FIG. 1a). The front can 104 further includes a sealing portion 110 for receiving the combined boot and inner seal 102. The sealing portion 110 may include a projection 112 which extends generally radially inwardly towards the axis A from the front can inner surface, shown at 114. The sealing portion 110 may further include a crimping portion 116, which is described further below.

The combined boot and inner seal 102 includes a boot portion 118 and an inner seal portion 120. The boot portion 118 inhibits entry of dirt and debris from the exterior environment into the interior of the CV joint 100. The boot portion 118 has a first or small end 121, at which is a shaft sealing portion 122 for mounting to the first shaft 16. The shaft sealing portion 122 may be similar to the shaft sealing portion 72 on the boot 12 in FIG. 1, and may include a projection 124 that engages the channel 74 in the first shaft 16. A holding means 126, such as an oetiker clamp, may be used to hold the first end 121 of the boot portion 118 to the shaft 16.

The combined boot and inner seal 102 has a second or large end 127 at which is a front can sealing portion 128. The front can sealing portion 128 mounts to and forms a seal with the front can 104 to inhibit leakage of lubricant 44 out to the exterior environment, and also inhibits entry of dirt and debris into the CV joint 100.

The front can sealing portion 128 may be made to have a press fit or interference fit with the sealing portion 110 of the front can 104, to form a seal therewith. A suitable adhesive may be applied between the front can sealing portion 128 and the sealing portion 110 to make up a portion of, or the entirety of, seal formed therebetween.

A channel 130 may be positioned on the front can sealing portion 128, which is adapted to receive the projection 112 on the front can 104. The channel 130 and projection 112 cooperate the channel 130 and projection 112 may cooperate to position the front can sealing portion 128 of the combined boot and inner seal 102 at a selected longitudinal position with respect to the CV joint 100. Additionally, they may make up a portion of the seal between the front can sealing portion 128 and the sealing portion 110.

Figure 3:
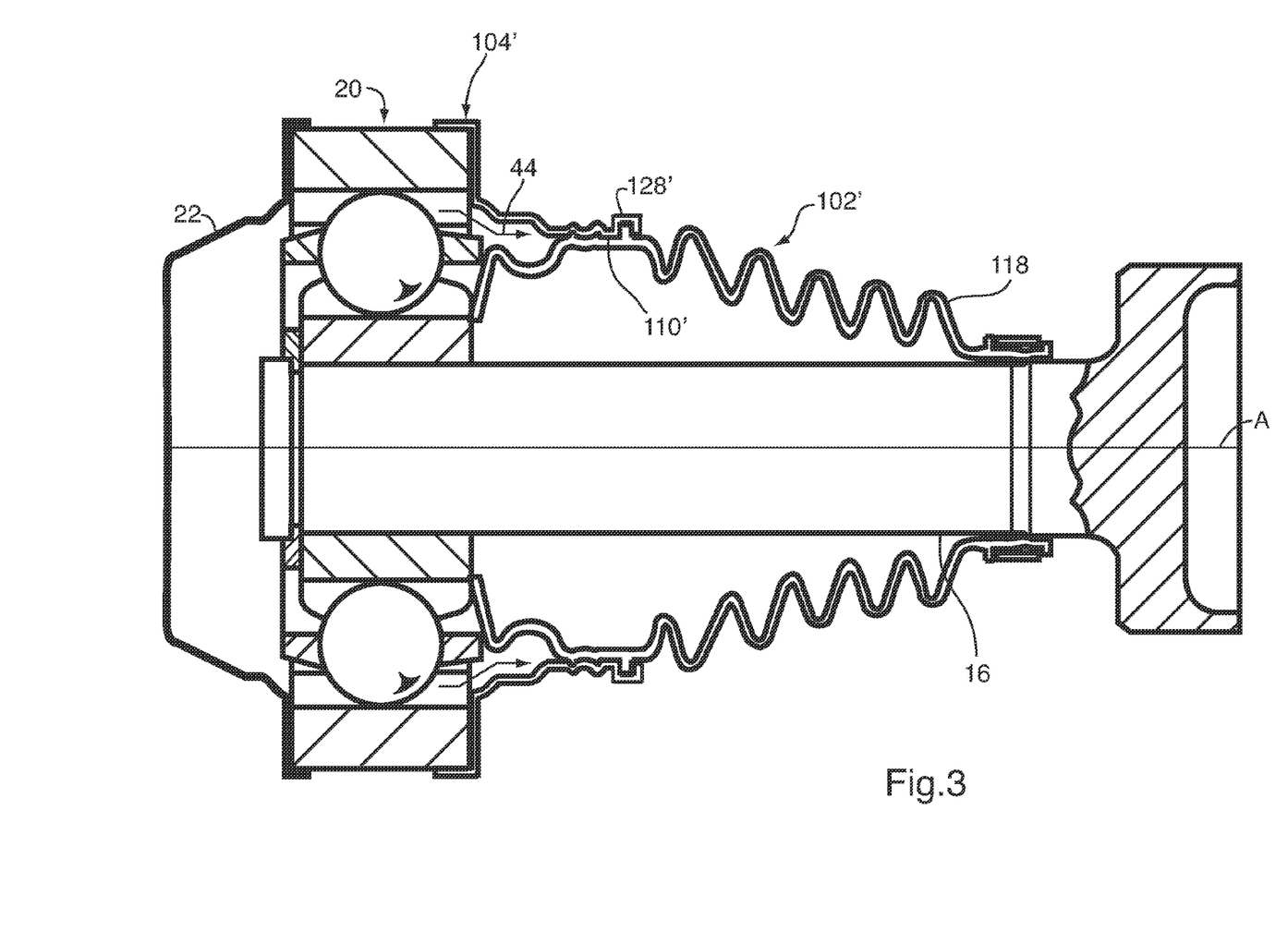
FIG. 3 is a sectional side view of a combined boot and inner seal for a CV joint in accordance with another alternative embodiment of the present invention.

It is alternatively possible for the projection 112 and channel 130 to be omitted. Reference is made to FIG. 3, which shows a combined boot and inner seal 102' and front can 104' which are similar to the combined boot and inner seal 102 and front can 104 respectively (see FIG. 2a), except that the combined boot and inner seal 102' and front can 104' do not include cooperating projections or channels in their mating surfaces that are part of their respective sealing portions, shown at 128' and 110' respectively.

Figure 2B:
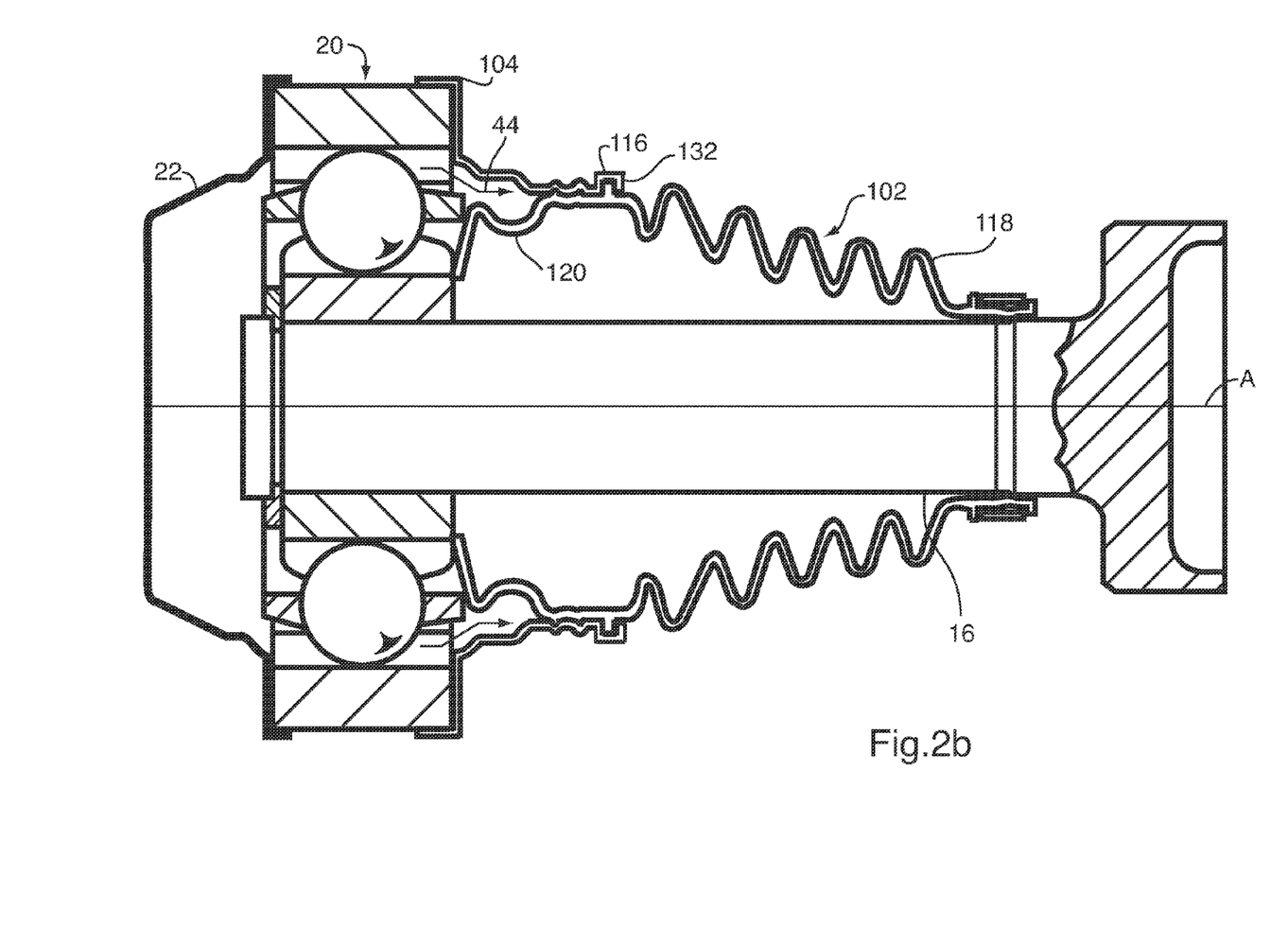
FIG. 2b is a sectional side view of the combined boot and inner seal and CV joint shown in FIG. 2a, as a complete assembly.

Referring to FIG. 2a, the front can sealing portion 128 of the combined boot and inner seal 102 may further include a flange portion 132 that extends generally radially outwards, for engagement with the crimping portion 116 on the front can 104. The crimping portion 116 can be crimped over the flange portion 132 to form the assembly shown in FIG. 2b. Once the crimping is completed, the flange portion 132 and the crimping portion 116 cooperate to retain the front can sealing portion 128 of the combined boot and inner seal 102 at a selected longitudinal position with respect to the CV joint 100. Additionally, they may form a portion of, or the entirety of, the seal between the front can sealing portion 128 and the sealing portion 110.

The inner seal portion 120 inhibits the migration of lubricant 44 from the bearing 20 into the boot portion 118. The inner seal portion 120 may include an optional accumulator portion 134, which may be similar to the accumulator portion 92 on the inner seal 14 shown in FIG. 1a. The inner seal portion 120 includes a shield portion 136, which may be similar to the shield portion 93 on the inner seal 14 shown in FIG. 1a.

Figure 4:
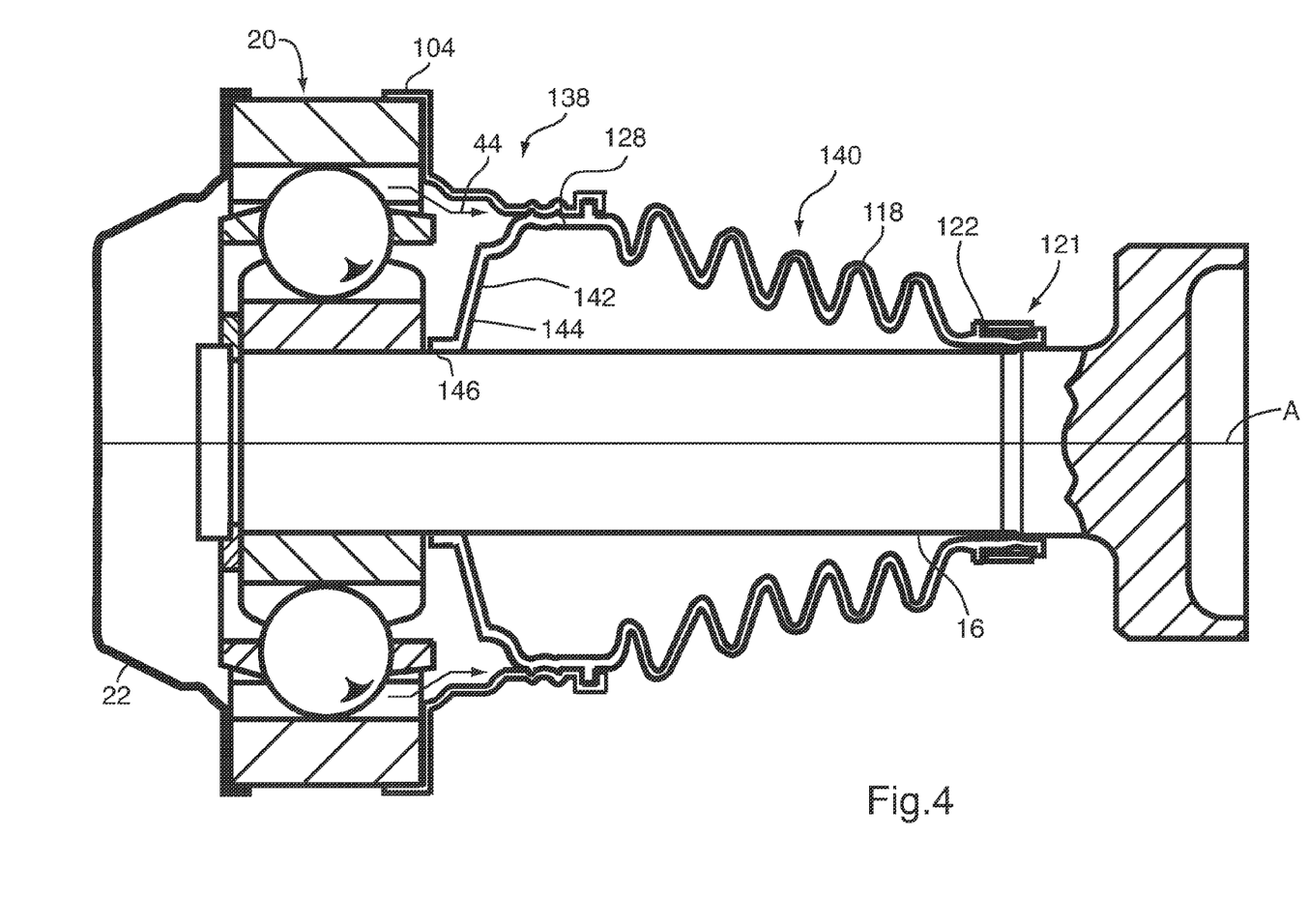
FIG. 4 is a sectional side view of a combined boot and inner seal for a CV joint in accordance with yet another alternative embodiment of the present invention.

Reference is made to FIG. 4, which shows the CV joint 138 in accordance with another embodiment of the present invention. The CV joint 138 may be similar to the CV joint 10 (FIG. 2a). A combined boot and inner seal 140 may be provided to protect the CV joint 138. The combined boot and inner seal 140 may be similar to the combined boot and inner seal 102 (FIG. 2a), and may include the boot portion 118 and the front can sealing portion 128. However, the combined boot and inner seal 140 includes an inner seal portion 142 instead of the inner seal portion 120 (FIG. 2a). The inner seal portion 142 inhibits the migration of lubricant 44 from the bearing 20 into the boot portion 118. The inner seal portion 142 includes a shield portion 144, which extends from the inner surface of the front can 104 all the way to the first shaft 16. The inner seal portion 142 further includes a second first shaft sealing portion 146, which forms a second seal with the first shaft 16 to inhibit migration of lubricant therebetween. Though not necessary, it is preferable that the seal formed between the shaft sealing portion 146 and the shaft 16 is maintained in all possible relative positions between the first and second shafts during operation of the CV joint 138. The inner seal portion 142 may be configured in several different ways to maintain the seal. For example, the inner seal portion 142 may include a sufficient amount of excess material between the front can sealing portion 128 and the shaft sealing portion 146 to accommodate relative longitudinal movement between the first and second shafts, and to also accommodate angular movement therebetween. The boot portion 118 has a first or small end 121, at which is a first shaft sealing portion 122 for mounting to the first shaft 16.

Alternatively, the shaft sealing portion 146 may be sized to permit sliding movement relative to the first shaft 16, while still maintaining a seal therewith.

The inner seal portion 142 may thus be configured to block substantially all lubricant 44 from reaching the boot portion 118. The use of a shield portion that extends all the way to the first shaft 16, and a shaft sealing portion for forming a seal with the first shaft 16, provides the inner seal portion 142 with the capacity to inhibit longitudinal migration of lubricant 44 into the boot portion 118 even when the lubricant 44 is relatively non-viscous. For example, the lubricant 44 may lose viscosity under increased temperatures, or simply as a result of age. When the viscosity of the lubricant 44 is reduced, some of the lubricant 44 may leave the bearing 20 under the force of gravity, while the CV joint 138 is at rest, and come to rest on the first shaft 16. When the CV joint 138 is next operated, the lubricant 44 that had been on the shaft 16 could be thrown outwardly towards the boot portion 118, or could by some other means continue to migrate longitudinally towards the boot portion 118. Even lubricant 44 that migrates along the shaft however, is inhibited from reaching the boot portion 118, however, by the shaft sealing portion 146 and inner seal portion 142.

The shield portion 144 and the shaft sealing portion 146 may be incorporated into the inner seal 14 to replace the shield portion 93 in the embodiment shown in FIG. 1a.

Figure 5:
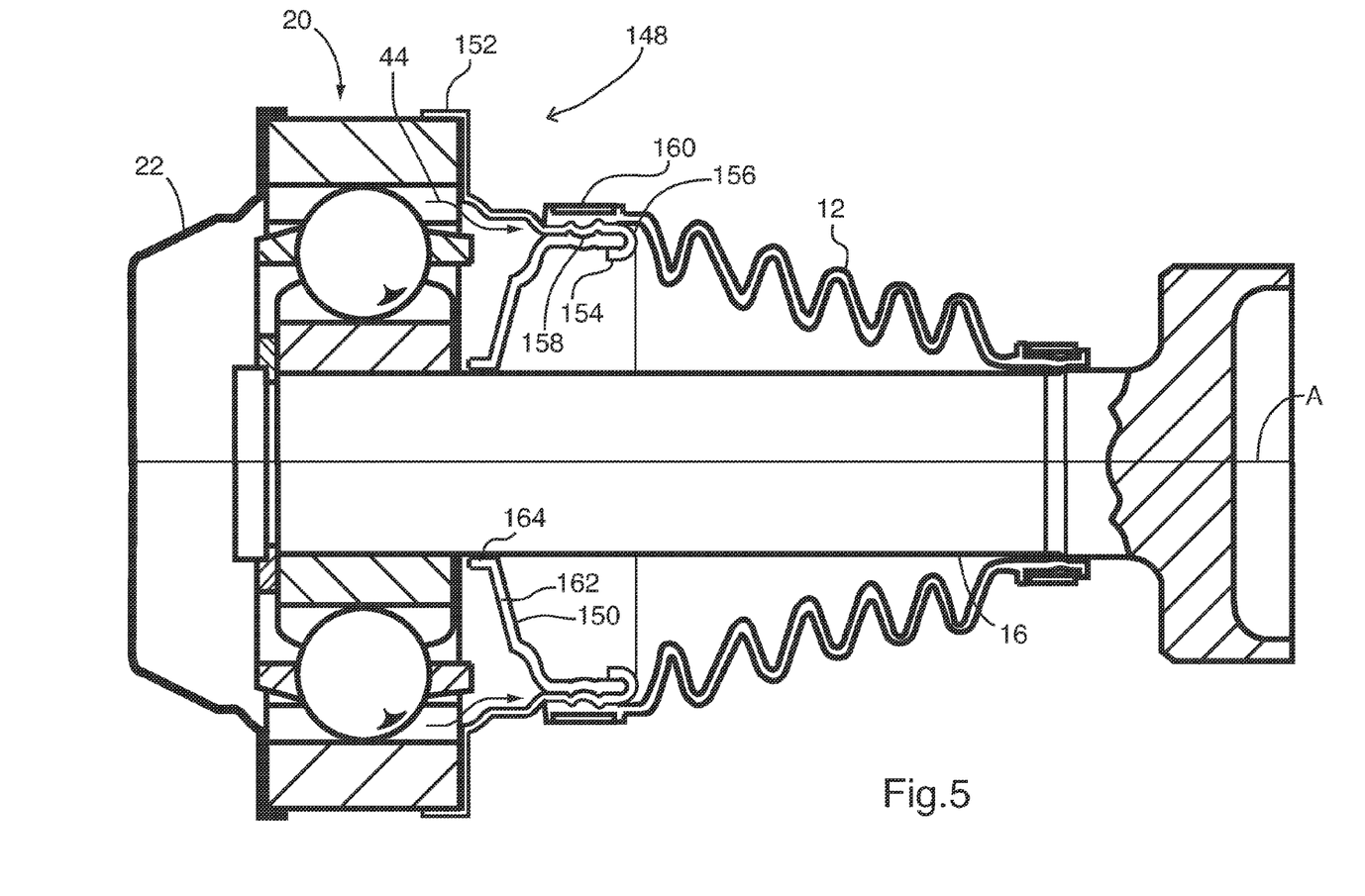
FIG. 5 is a sectional side view of an inner seal for a CV joint in accordance with yet another alternative embodiment of the present invention.

Reference is made to FIG. 5, which shows a CV joint 148 with the CV joint boot 12 and an inner seal 150 made in accordance with another embodiment of the present invention. The CV joint 148 may be similar to the CV joint 10 (FIG. 1a), except that the CV joint 148 includes a front can 152 instead of the front can 24 (FIG. 1a). The front can 152 includes a crimping portion 154 that is configured to be crimped over the front end 156 of the inner seal 150. to retain the inner seal 150 in position and to assist in the seal obtained therebetween to inhibit migration of lubricant 44 into the boot 12.

Figure 6:
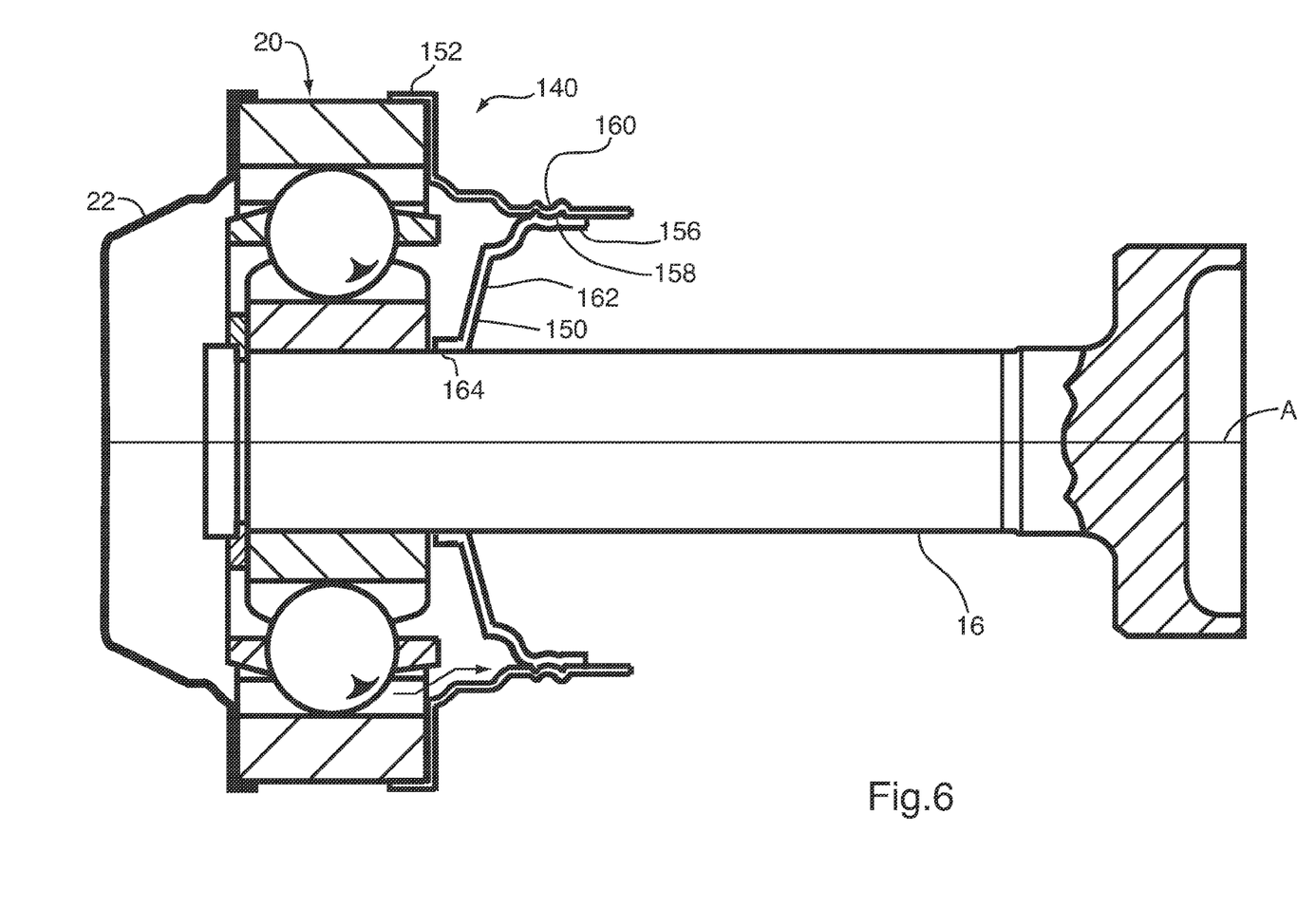
FIG. 6 is a sectional side view of the inner seal and CV joint shown in FIG. 5, shown at an intermediate stage of assembly.

Reference is made to FIG. 6. Prior to crimping, the inner seal 150 may be positioned at a selected longitudinal position with respect to the CV joint 148 by means of a projection 158 and a cooperating channel 160 on the front can 152 and the inner seal 150 respectively. Adhesive may optionally be used to adhere the inner seal 150 and front can 152 together and to assist in forming a seal therebetween.

Referring to FIG. 5, once the inner seal 150 is positioned in the front can 152, the crimping portion 154 can be crimped over the front end 156 of the inner seal 150. The boot 12 can then be mounted onto the front can 152 in similar fashion to the mounting of the boot 12 onto the front can 24 in the embodiment shown in FIG. 1a.

In the embodiment shown in FIGS. 5 and 6, the inner seal 150 includes a shield portion 162 and a shaft sealing portion 164, which together inhibit lubricant 44 migration over the entire cross-sectional area between the inner surface of the front can 152 and the first shaft 16 towards the boot 12. The shield portion 162 and the shaft sealing portion 164 may be similar to the shield portion 144 and the shaft sealing portion 146 in the embodiment shown in FIG. 4.

In the embodiments shown in the figures, the front can is shown to be directly connected to the bearing. It is alternatively possible for the front can to be indirectly connected to the bearing, such that whatever connects the front can to the bearing inhibits leakage of lubricant out of the CV joint, and inhibits entry of dirt and debris into the interior of the CV joint.

In the positions shown in the figures, the CV joint, the boot or boot portion, the inner seal or inner seal portion and the first and second shafts are all in alignment such that they all centered about the longitudinal axes A and B. During operation, however, certain of these components may be positioned at a non-zero angle with respect to other of these components. Nonetheless, for the purposes of this invention, all of these components can still be said to centered about or along the longitudinal axes A and B even when they are positioned at a non-zero angle with respect to each other.

As will be apparent to persons skilled in the art, various modifications and adaptations of the apparatus described above may be made without departure from the present invention, the scope of which is defined in the appended claims.

The invention claimed is:

1. An inner seal for protecting a CV joint boot for a CV joint, the CV joint including a bearing, a back sealing means and a front can, wherein the bearing operatively connects a first shaft and a second shaft, the bearing has an inner race and an outer race and has a front and a back, wherein the first shaft is connected to the inner race and wherein the second shaft is connected to the outer race, and wherein the front can is connected to the outer race, the back sealing means seals against leakage of lubricant from the back of the bearing, wherein the CV joint boot seals with the front can and wherein the CV joint boot has an interior, the inner seal comprising:

an inner seal body having a front can sealing portion for sealing with an inner seal sealing portion of the front can, the front can sealing portion of the inner seal body having a size relative to the inner seal sealing portion of the front can to establish an interference fit therebetween, the interference fit inhibiting migration of lubricant from the bearing therebetween, the front can sealing portion having a flange portion configured to engage a shoulder provided on the front can, the flange portion extending radially outward and terminating at a position adjacent the CV joint boot, thereby encompassing the shoulder therebetween, the inner seal body having a shaft sealing portion for sealing with the first shaft to inhibit the migration of lubricant from the bearing therebetween, and the inner seal body having a shield portion that extends between the front can sealing portion and the shaft sealing portion.

2. An inner seal as claimed in claim 1, wherein the shaft sealing portion is sized to permit relative sliding movement between the shaft sealing portion and the first shaft.

3. An inner seal as claimed in claim 1, wherein the CV joint has a CV joint longitudinal axis and the front can has an inner surface and includes a projection that extends inwardly from the inner surface towards the CV joint longitudinal axis, and wherein the inner seal body has a channel for engaging the projection.

4. An inner seal as claimed in claim 3, wherein the projection and channel are mutually engageable to form at least a portion of the seal between the front can sealing portion and the front can.

5. An inner seal for protecting a CV joint boot for a CV joint, the CV joint including a bearing, a back sealing means and a front can and having a CV joint longitudinal axis, wherein the bearing operatively connects a first shaft and a second shaft, the bearing has an inner race and an outer race and has a front and a back, wherein the first shaft is connected to the inner race and wherein the second shaft is connected to the outer race, wherein the back sealing means seals against leakage of lubricant from the back of the bearing, wherein the front can is connected to the outer race, wherein the front can has an outer surface and an inner surface, and wherein the CV joint boot seals with the front can and the CV joint boot has an interior, the inner seal comprising:

an inner seal body having a front can sealing portion for forming a connection with the front can and for sealing with an inner seal sealing portion of the front can, the front can sealing portion of the inner seal body having a size relative to the inner seal sealing portion of the front can to establish an interference fit therebetween, the interference fit inhibiting migration of lubricant from the bearing therebetween, the front can sealing portion having a flange portion configured to engage a shoulder provided on the front can, the flange portion extending radially outward and terminating at a position adjacent the CV joint boot, thereby encompassing the shoulder therebetween, wherein, in use, the connection between the inner seal and the front can is entirely separate from the connection between the front can and the outer race, and wherein, in use, the inner seal body extends from the front can sealing portion generally inwardly towards the CV joint longitudinal axis to block lubricant from migrating into the interior of the CV joint boot.

6. An inner seal as claimed in claim 5, wherein, in use, the inner seal body extends generally inwardly towards the CV joint longitudinal axis from the front can sealing portion and longitudinally towards the bearing.

7. An inner seal as claimed in claim 5, wherein the inner seal body includes an accumulator portion for accumulating lubricant that escapes from the bearing.

8. An inner seal as claimed in claim 5, wherein the inner seal body includes a bearing sealing portion for sealing with the inner race of the bearing.

9. An inner seal as claimed in claim 5, wherein the inner seal body includes a second shaft sealing portion for forming a seal with the first shaft for inhibiting migration of lubricant from the bearing therebetween.

10. An inner seal as claimed in claim 9, wherein the second shaft sealing portion is sized to permit relative sliding movement between the second shaft sealing portion and the first shaft.

11. An inner seal as claimed in claim 5, wherein the front can has an inner surface and includes a projection that extends inwardly towards the CV joint longitudinal axis from the inner surface, and wherein the inner seal body has a channel for engaging the projection.

12. An inner seal as claimed in claim 11, wherein the projection and channel are mutually engageable to form at least a portion of the seal between the front can sealing portion and the front can.

13. An inner seal as claimed in claim 5, wherein, in use, the connection between the inner seal and the front can is entirely separate from the connection between the front can and the CV joint boot.

* * * * *